(12) United States Patent
Gibbs et al.

(10) Patent No.: US 6,278,706 B1
(45) Date of Patent: Aug. 21, 2001

(54) WIRELESS PACKET DATA COMMUNICATION APPARATUS AND METHOD

(75) Inventors: Benjamin Kendrick Gibbs; Izzet Murat Bilgic; Carl Mansfield, all of Colorado Springs, CO (US)

(73) Assignee: Opuswave Networks, Inc., Colorado Springs, CO (US)

( * ) Notice: Subject to any disclaimer, the term of this patent is extended or adjusted under 35 U.S.C. 154(b) by 0 days.

(21) Appl. No.: 09/055,110

(22) Filed: Apr. 3, 1998

(51) Int. Cl.[7] ............................... H01L 12/66; H04J 3/16
(52) U.S. Cl. ..................... 370/352; 370/401; 370/465
(58) Field of Search ..................... 370/338, 349, 370/353, 355, 352, 401, 465; 375/222

(56) References Cited

U.S. PATENT DOCUMENTS

| | | | |
|---|---|---|---|
| 4,962,499 | * 10/1990 | Sennema | 370/353 |
| 5,008,878 | 4/1991 | Ahmadi et al. | 370/60 |
| 5,305,308 | * 4/1994 | English et al. | 370/353 |
| 5,729,544 | * 3/1998 | Lev et al. | 370/353 |
| 5,867,495 | * 2/1999 | Elliott et al. | 370/352 |

* cited by examiner

*Primary Examiner*—Hassan Kizou
*Assistant Examiner*—Afsar M. Qureshi

(57) ABSTRACT

A method for establishing wireless communication comprising transmitting a request signal indicative of a request to establish communication with an external device external to a wireless communication device; determining at the wireless communication device based upon the request signal whether the external device communicates using a packet transmission protocol or a circuit switched transmission protocol; and if said external device communicates using a packet transmission protocol, transmitting subsequent communications from the wireless communication device directed to the external device using the packet transmission protocol.

22 Claims, 9 Drawing Sheets

WIRELESS PACKET DATA COMMUNICATION APPARATUS AND METHOD

BACKGROUND

1. Field of the Inventions

The field of the present inventions pertains to wireless communication systems, including among other things, a method and apparatus for wireless transmission of signals using both packet protocols and circuit switched protocols.

2. Description of the Related Art

Wireless communication systems are growing in size and number through out the world. A service that more and more wireless networks are providing is the transmission of data. Wireless networks also connect and interface with landline networks that do not use the same transmission protocols as the wireless networks. One group of popular protocols developed and used in landline networks for transmitting data are referred to as packet transmission protocols. These landline protocols are favored for transmitting data due to their robustness and flexibility.

Packet transmission protocols are especially common as Wide Area Network Protocols (WAN). Known packet protocols include X.25, TCP/IP and Frame Relay protocols. The TCP/IP protocol is used for transmission in Internet applications such as the World Wide Web (WWW), File Transfer Protocol (FTP) and Simple Mail Transfer Protocol (SMTP).

A wireless communication unit operating according to the CDPD (Cellular Digital Packet Data) protocol revision 1.1 established by the Wireless Data Forum, can transmit messages using a packet transmission protocol. Preferably, the wireless unit that is capable of transmitting data utilizing a CDPD protocol for data, should be able to switch between the packet data protocol and a circuit switched protocol depending on the service requested. However, in known wireless units switching between a packet protocol and a circuit switched protocol has required either manual user intervention or switching through the personal computer that the user is operating. Manual switching by the user either by physical switching or changing program settings is both time consuming and unreliable. Switching through the personal computer increases the processing overhead thereby decreasing the transmission rate. Further, switching by either the user or through the computer itself decreases the transmission rate since multiple interfaces may be required between the computer and the wireless transmission unit. An additional difficulty with having the switching capability reside in the computer or data device is that the computer operates using multiple clients, one for each protocol. The use of multiple clients increases the processing overhead and the complexity of the system.

SUMMARY OF THE INVENTIONS

The present invention comprises a wireless communication unit capable of communicating using both circuit switched transmission protocols and packet transmission protocols. The wireless communication unit is preferably able to switch between a circuit switched transmission protocol and a packet transmission protocol in a way which is transparent to the user, while at the same time minimizing the number of interfaces on the wireless communication unit and the number of clients that are required on a computer connected to the wireless communication unit.

In one embodiment a method for establishing wireless communication comprises transmitting a request signal to establish communication with an external device external to a wireless communication device; determining using the request signal the transmission protocol to be used for communication with the external device; if the external device communicates using a packet transmission protocol, transmitting from the wireless communication device to the external device using the transmission protocol of the external device.

In another embodiment a wireless communication device comprises a data terminal adapter that communicates with an external device using a particular protocol. A mobile subsystem communicates with the data terminal adapter. The mobile subsystem also communicates with the external device using a different transmission protocol. When the mobile subsystem receives a signal comprising a request to establish communication with the external device, it is determined which transmission protocol to use to communicate with the external device.

In yet another embodiment a wireless communication device comprises a multiple input and output switch. The switch couples the appropriate input to the appropriate output in response to a protocol signal. A packet server communicates with the switch and a data terminal adapter. A transceiver is coupled to the data terminal adapter and the packet server. A decoder is also coupled to the switch, wherein when the decoder receives a request signal for connection to a service capable of communicating using a particular protocol the decoder provides a protocol signal to the switch.

It is an object of an aspect of the present invention to create a wireless unit that can transmit signals both using a packet transmission protocol and a circuit switched transmission protocol, while maintaining an interface that is transparent to the user regardless of the transmission protocol used.

It is another object of an aspect of the present invention to create a wireless unit that can transmit signals both using a packet transmission protocol and a circuit switched transmission protocol, while minimizing the amount of configuration performed by the user.

It is yet another object of an aspect of the present invention to create a wireless unit that can transmit signals both using a packet transmission protocol and a circuit switched transmission protocol that has a uniform interface to the user regardless of the transmission protocol used.

This and other objects and aspects of the present invention are depicted and describe in the following drawings and detailed description thereof.

DESCRIPTION OF THE PREFERRED EMBODIMENTS

Figure 1:
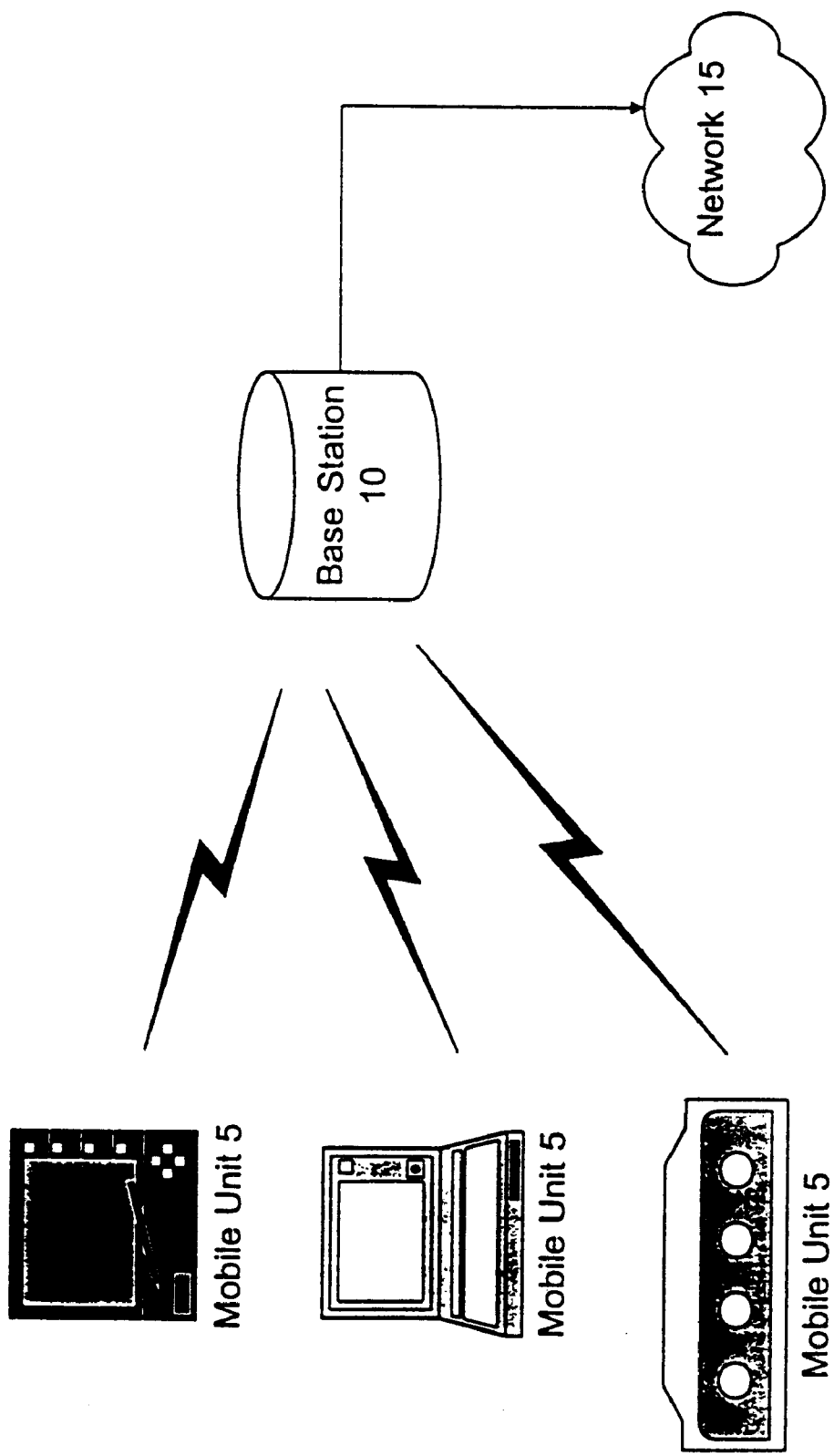
FIG. 1 is a diagram showing a wireless network capable of communicating using packets in conjunction with the present inventions.

Referring to FIG. 1, mobile unit 5 communicates with a wireless base station 10. Mobile unit 5 is able to connect to a network 15 through base station 10. The network 15 can be a Public Service Telephone Network (PSTN), a data network or other communications network. Network 15 can for instance be a packet network that communicates using the Internet Protocol (IP).

A mobile unit 5, is any sort of end-user product; from Laptop Computers to Vending Machines to a Package being tracked en route. The Mobile End System (MES) is the means by which the Network subscribers gain access to the available wireless communication services and is a functional description of the mobile unit and any attached data processing devices used in the wireless communication process. Mobile Unit 5 may be physically mobile or stationary, but is considered as always being potentially mobile. Furthermore, the physical location of mobile unit 5 may change with time, but continuous network access is maintained. Mobile unit 5 moves transparently from cell to cell or network to network in a fashion that is transparent to the end-user applications, for instance a web browser.

Figure 2:
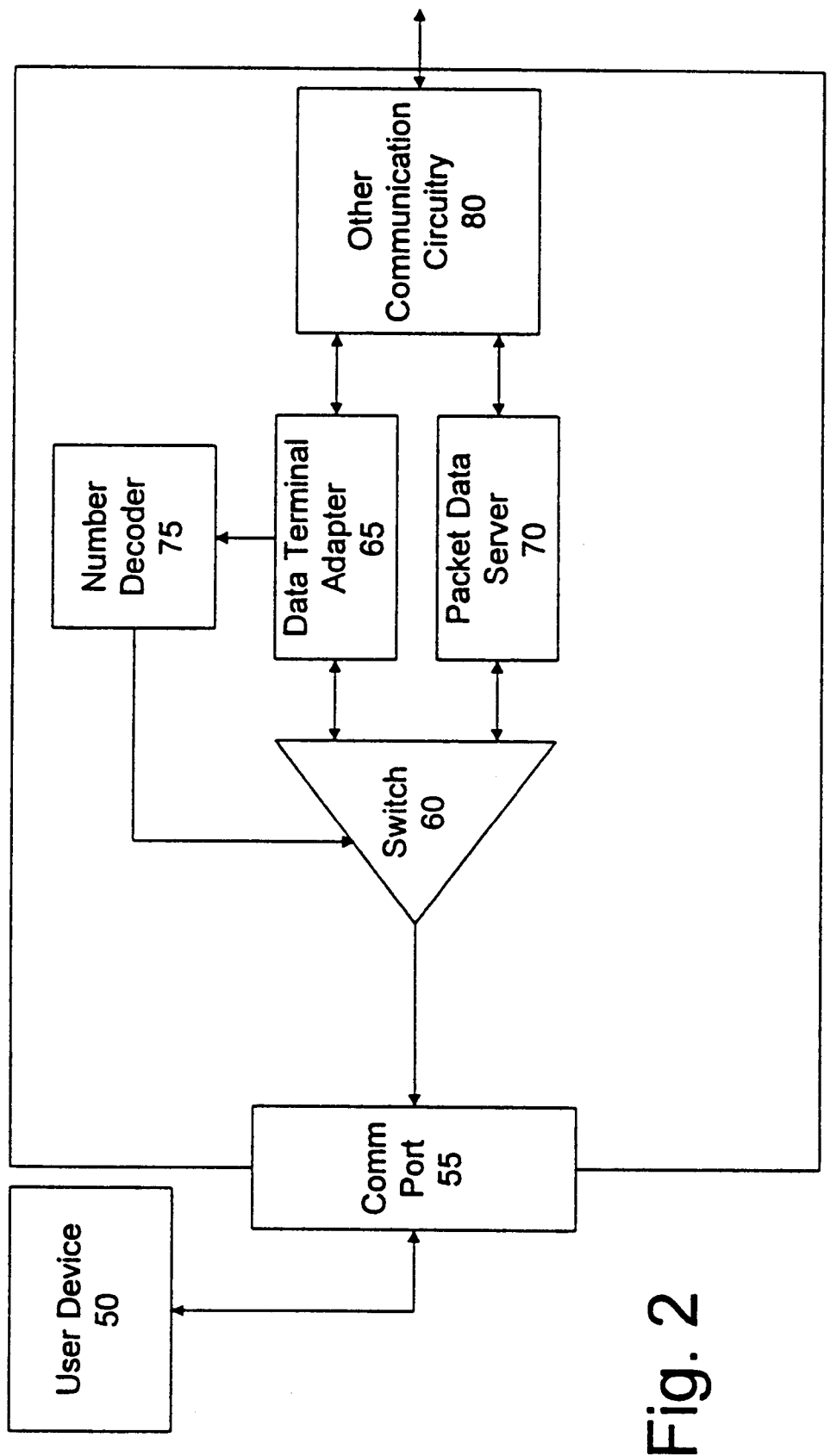
FIG. 2 is a diagram of a packet enabled wireless communication unit according to a preferred embodiment of the present inventions.

Referring to FIG. 2, a mobile unit 5 is the wireless device that is used for sending and receiving communications between the user and the network. In one embodiment the mobile unit is a customer premises radio unit (CPRU). The mobile unit 5 and user terminal 50 may be separate elements or an integrated device, various levels of integration between user terminal 50 and mobile unit 5 are discussed with respect to FIGS. 9–11 below. User terminal 50 runs the user applications such as e-mail clients, web browsers, word processors, etc.

User terminal 50, which can also be referred to as the Data Terminal Equipment, can be a personal computer, a laptop computer, a Personal Digital Assistant (PDA), a Hand Held device or other device capable of processing data. User terminal 50 is connected to mobile unit 5 through a physical interface, which is preferably a serial port 55 although other interfaces such as parallel ports or busses can be used with the present inventions without departing from the scope of the present inventions. A factor in determining the interface type and method to be used is the level of integration between the user terminal 50 and the mobile unit 5.

Communication Port 55, which in personal computers is a serial port, is coupled to a switch 60 within mobile unit 5. Switch 60 directs signals input into through port 55 to the Data Terminal Adapter (DTA) 65 or the Packet Data Server 70 depending on the communication protocol that the mobile unit 5 is utilizing.

Packet data server 70 frames outgoing packets and unframes incoming packets received by the mobile unit 5. Packet data server 70 can be configured to support a number of packet transmission protocols including TCP/IP, X.25, Frame Relay or other packet transmission protocols. The packet data server 70 can be used to support one or more of the protocols in the same mobile unit, depending on the usage of the system. It is preferred in the case of a wireless modem that the system be able to support a number of different packet transmission protocols.

Number decoder 75 can be a database or other functionality that determines whether a specific telecommunications number associated with a request for connection to an external network is for a network that can communicate using a packet transmission protocol. In a preferred embodiment, the number decoder reads the telecommunications number input by the user unit 50 and then determines whether the telecommunications number corresponds to an stored list of numbers that support a packet transmission protocol that the packet data server 70 supports. The telecommunications number and connection type can be updated over the air by transmissions from the base station 10 and network 15. It is further possible to store the network address of the network associated with the telecommunications number in the database.

In this way mobile unit 5 is capable of supporting transmission protocols for both circuit switched and packet based transmission. By using an intelligent switching system in the mobile unit 5, the transmission mode used by the mobile unit 5 and network 15 is transparent to the user terminal 50. Further, the preferred system allows for the use of a single client for communicating in both circuit switched and packet transmission protocols. The functionality of the preferred mobile unit 5 allows a user to simply transmit data to the mobile unit without having to determine whether the protocol is a packet transmission protocol or a circuit switched transmission protocol. The intelligent switching system of the present inventions saves the user time, computer processing overhead, increases reliability, and prevents errors and problems associated with manual user switching.

Data terminal adapter 65 and packet data server 70 are coupled to the communication circuitry 80 which is the circuitry that performs the over the air transmission, reception, modulation, and demodulation of signals and other functions required for the transmission of signals between the mobile unit 5 and the base station 10 (FIG. 1).

In the embodiment of FIG. 2 the mobile unit can be divided into the subscriber unit data terminal adapter (SU-DTA) 140 and a subscriber unit mobile station (SU-MS) 150 which would show the division of the physical system for the purposes of complying with revision 1.1 of the CDPD specification.

Figure 3:
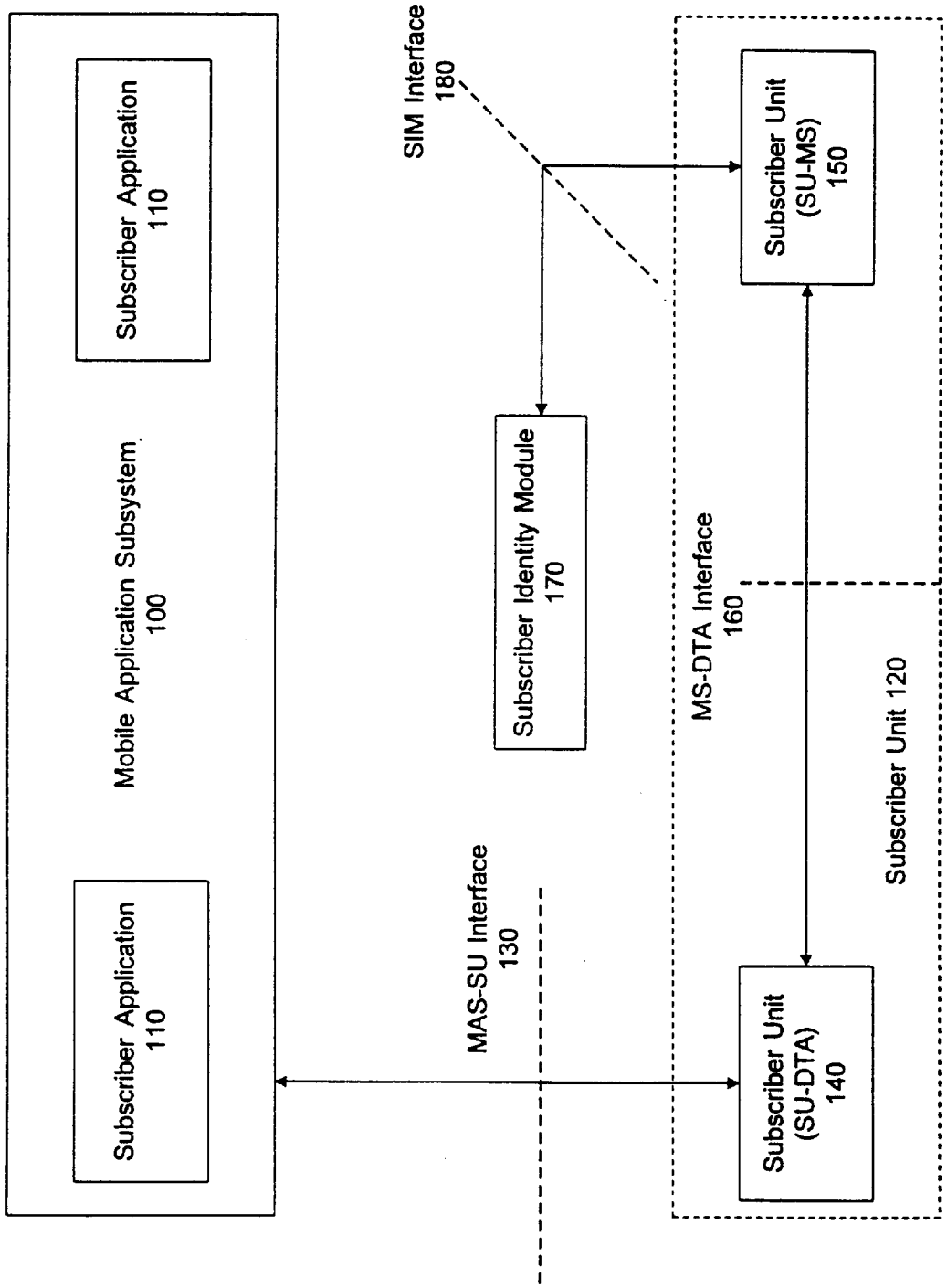
FIG. 3 is a functional diagram showing the division of functions and the interfaces between the subsystems in a preferred embodiment of a wireless communication unit according to a preferred embodiment of the present inventions which is divided according to CDPD specifications.

Referring to FIG. 3, Mobile Application Subsystem (MAS) 100 includes the Subscriber Applications 110 that function independently of the packet transmission protocol. The Subscriber Applications 110 include those functions that are required for general communication and data transmission, as well as the user applications and are independent of the network communication environment. Potential Subscriber Applications 110 include file transfer applications, electronic mail applications, remote terminal applications, remote monitoring applications, etc. The MAS 100 is a function or set of functions that preferably reside in the user terminal 50.

MAS 100 communicates with SU-DTA 140 across a MAS-SU interface 130. The SU-DTA 140 is the subsystem that supports both packet and circuit switched data protocols and related functions. The SU-MS 150 is the other communication circuitry 80 as seen in FIG. 2. The SU-DTA 140 and the SU-MS 150 may be integrated to form a single subscriber unit (SU) 120. Alternatively, the SU-DTA 140 and the SU-MS 150 may be separate physical entities.

The SU-DTA 140 supports the packet transmission protocols and functionality, and preferably supports a communication protocol that is compliant with the CDPD protocol. SU-DTA 140 and SU-MS 150 communicate across an MS-DTA interface 160. Both the SU-DTA 140 and the SU-MS 150 both preferably reside within the mobile unit 5. Subscriber Identity Module (SIM) 170 is the subsystem that defines the identity and access rights of the Mobile Unit 5 to the external network. Information contained in the SIM 170 includes the one more or unique Internet Protocol Address (es) assigned by the operator for use by mobile unit 5 and user device 50. The SIM 170 also contains the telecommunications number database from which the number decoder 75 determines whether the desired communication service utilizes a packet transmission protocol for communication. The SIM further may contain the network address of each individual network 15 that corresponds to a specific telecommunications number.

SIM 170 communicates with the SU 120 across an SIM interface 180. Alternatively, SIM 170 can be a subsystem of the SU 120 or the SU-MS 150. Preferably, the SIM 170 communicate across the SIM interface 180 and does not communicate with the MAS 100 directly for security reasons.

The MAS-SU interface 130, the MS-DTA interface 160 and the SIM interface 180 can be implemented as Application Program Interfaces (API's), hardware interfaces or a combination of the two, so long as communication between the subsystems is facilitated. The physical interface of the MAS-SU interface 130 can be a serial or bus connection, which creates a signal path between MAS 100 and SU-DTA 140. The interface preferably is an AT interface that transfers signals in either a command or on-line data transmission mode. The entities of the MAS 100 and the SU-DTA 140 that communicate with each other are the communication drivers. The MAS 100 communications driver is preferably a standard communications driver that is shipped with the operating system of a PC or other similar device. The SU-DTA 140 communications driver is dependent on the type of SU 120 being used and preferably supports an AT interface. An interworking function which is one of the functions performed by the SU-DTA 140 communication driver, translates the AT commands to a command set which is used by the SU-DTA 140.

Figure 4:
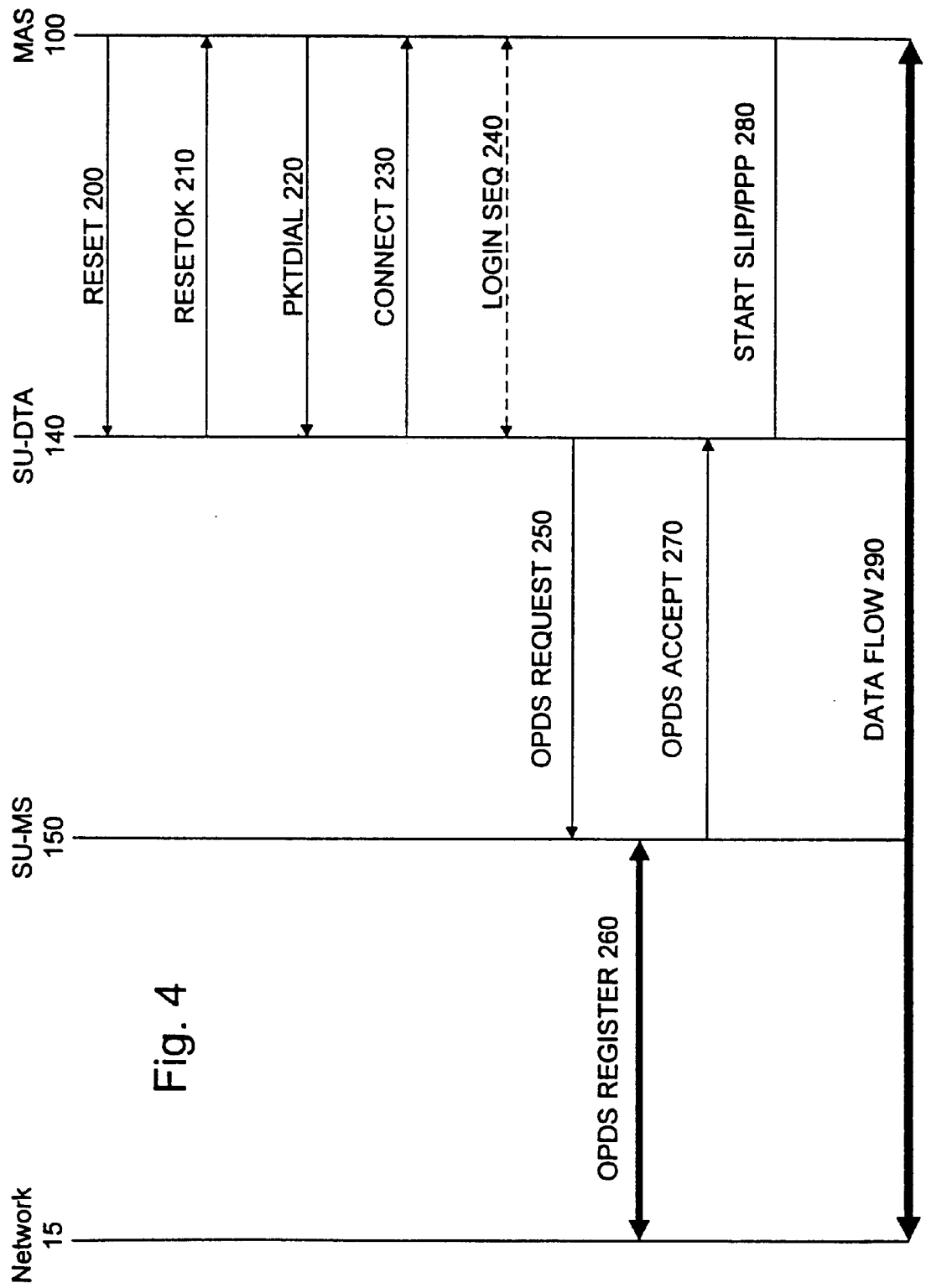
FIG. 4 is a diagram showing the communication between the subsystems of a preferred wireless communication unit during a successful initialization of a packet data link between the wireless communications unit and an external data network according to a preferred embodiment of the present inventions.

Referring to FIG. 4, to initiate communication with an external network capable of packet based communication a reset signal 200 is sent from the MAS 100 to the SU-DTA 140. SU-DTA 140 resets the mobile unit and then transmits a "resetok" signal 210 to the MAS 100. The MAS 100 then sends the dial command with the telecommunications number 220. Once the telecommunications number 220 is dialed and an initial connection is established, connect signal 230 is transmitted from the DTA 65 to the MAS 100. Next the MAS 100 and SU-DTA 140 exchange a login sequence 240. The login sequence 240 is dependent on the service type and software used by the mobile unit 5 and the service provider.

Once the login sequence 240 is completed the DTA 65 issues a connection request to the SU-MS 150 which begins a registration sequence with the data packet network. Once the SU-MS 150 establishes a link to the data packet network the SU-MS 150 transmits a signal indicating that a link with the data packet network has been established. Upon receiving to signal indicating that a link with the packet data network has been established, the SU-DTA 140 transmits a signal to the MAS 100 that the system can begin communication using a packet data format, i.e., using a SLIP or PPP network in the case of a wireless modem.

It should be noted that in the preferred embodiment of FIG. 4 the command mode used for communicating between the MAS 100 and the SU-DTA 140 is an AT command set which is compatible with most standard modems in use today. However, other command modes can be used for communication between the MAS 100 and the SU-DTA 140, including proprietary manufacturer command modes. It is preferred for the purposes of being able to interchange mobile unit in many different systems that an industry standard command set, such as the preferred AT command set is used.

Figure 5:
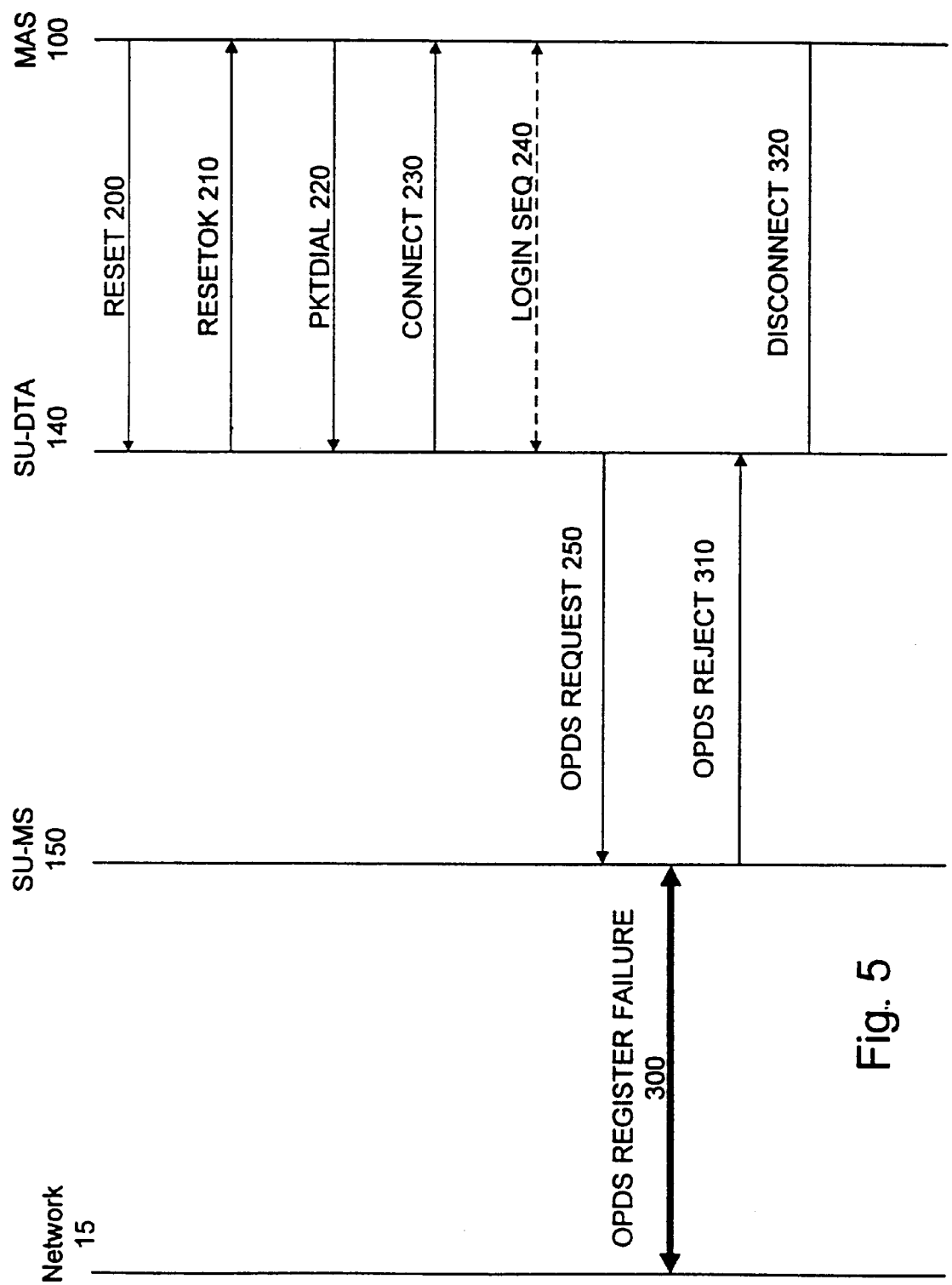
FIG. 5 is a diagram showing the communication between the subsystems of a preferred wireless communication unit during a failed initialization of a packet data link between the wireless communication unit and an external data network according to a preferred embodiment of the present inventions.

Referring to FIG. 5, the sequence for communication is the same as described with respect to FIG. 4 except that a registration failure command 300 is issued as opposed to a registration command 260. The registration failure is transmitted from the mobile subsystem to the data terminal adapter at 310. At 320, a disconnect command is issued from the data terminal adapter to the user equipment.

Figure 6:
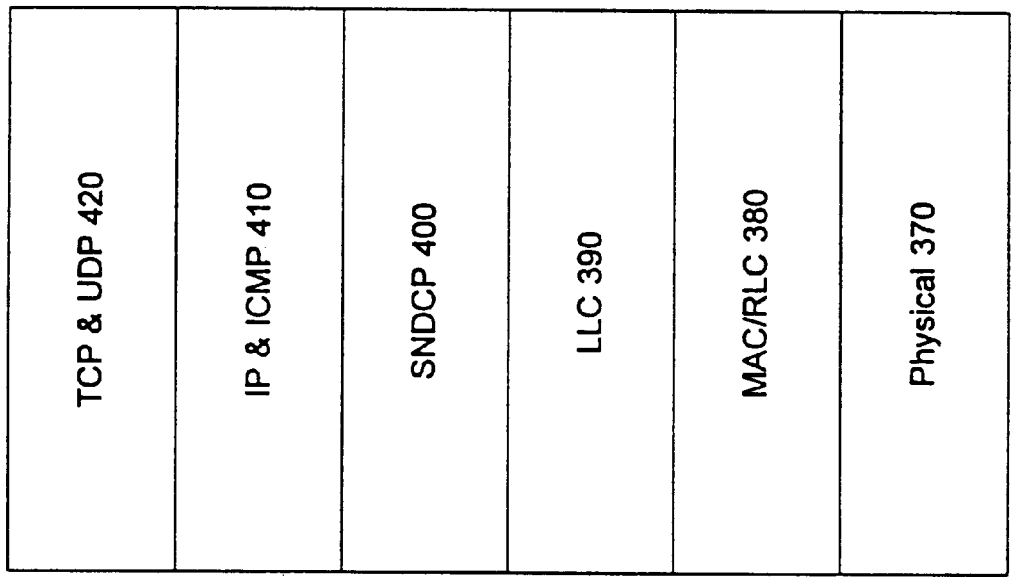
FIG. 6 is a diagram showing the protocol layers used in a preferred embodiment of the present inventions which is compliant with the CDPD specifications.

Referring to FIG. 6, the protocol stack 350 describes the layers used for the purposes of transmitting information, i.e. packets. The physical layer 370 includes the components of the system in the packet data server 70. MAC/RLC layer 380 provides for reliable low-level data transfer between the SU-MS 150 and the base station 10 and the means for establishing the link. MAC/RLC layer 380 is used for the transfer of user and control data. Logical link layer 390 provides end-to-end link control and establishment between SU-MS 150 and the base station 10. Logical link layer 390 may also be used for the transfer of user and control data. The Sub Network Dependent Convergence Protocol (SNDCP) layer 400 translates the packets from an IP format to a format that can be transmitted over the logical link layer 390 for transmission within the base station 10. Internet Protocol Layer 410 contains communications which are in the transparent packet format as well as the Internet Control Message Protocol which is used to inform the host system and routers of errors that occur in the network 15. Internet Protocol Layer 410 may comprise sublayers for Point to Point (PPP) protocol and a Serial Link Internet Protocol (SLIP). Transfer Control Protocol Layer 420 is used to transfer and control the transmission of the packets between the mobile unit 5 and the network 15.

SNDCP layer 400 is the highest layer in the protocol stack that preferably is able to communicate messages to the base station IO that are not routed on to the network 15. The SNDCP layer 400 is also used to interface with MAS 100. In this way information can be transferred from the SA 110 and can be translated into both IP packets and control signals immediately. Additionally, Internet Protocol header compression and encryption occurs in the SNDCP layer 400.

Internet Protocol Layer 410 contains the functionality to allow the mobile unit 5 to be able to transfer packet data in the appropriate format with external networks. To be able to communicate with user terminal 50 through a serial port 55, internet protocol layer will preferably operate using a Point to Point Protocol. The point to point protocol comprises three basic functions: (1) A method for encapsulating multi-protocol datagrams (packets); (2) Link Control Protocol for establishing, configuring and testing the data-link connection; and (3) Network Control Protocols for establishing different network-layer protocols. In a preferred embodiment of the present invention Internet Protocol Control Protocol as described in Internet Request For Comments No. 1332, "The PPP Internet Protocol Control Protocol (IPCP)," May 26, 1992.

Figure 7:
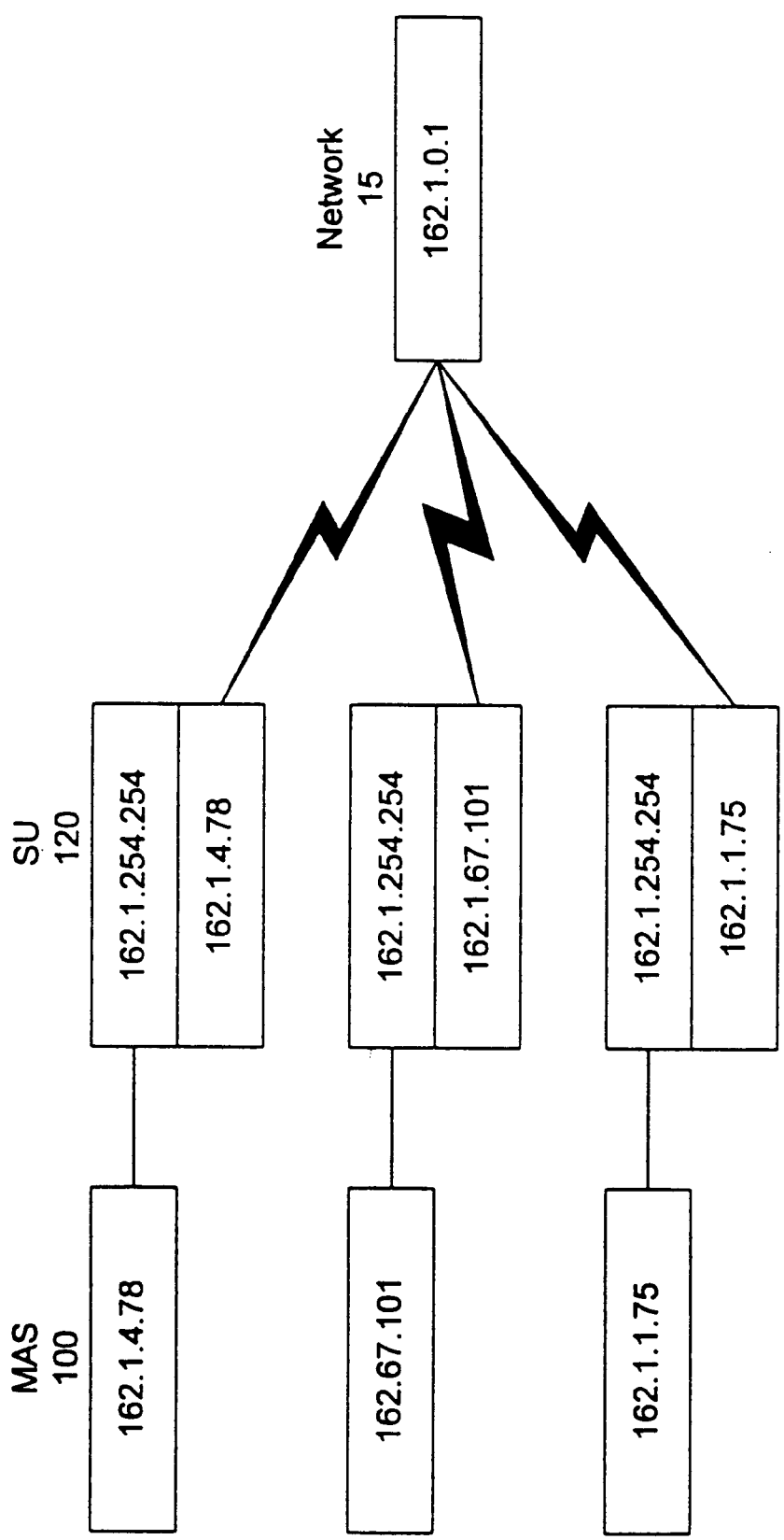
FIG. 7 is a diagram showing the IP address allocation scheme according to the present invention.

In a preferred embodiment the SU 120 is the network host to the client MAS 100. As can be seen in FIG. 7, the SU has an IP address that is assigned to it by the landline network 15. The network 15 includes physical server with which the mobile unit 5 is communicating data using the packet protocol at issue, for instance IP. It can be seen that each MAS 100 is assigned a separate IP address, which is individual to each mobile unit 5 and can be stored in SIM 170. The IP address assigned to each MAS 100 is invisible to the outside world, that is, the PPP connection established between MAS 100 and the SU 120 exists only between the two and all packets addressed to mobile unit 5 will be addressed to SU 120.

Figure 8:
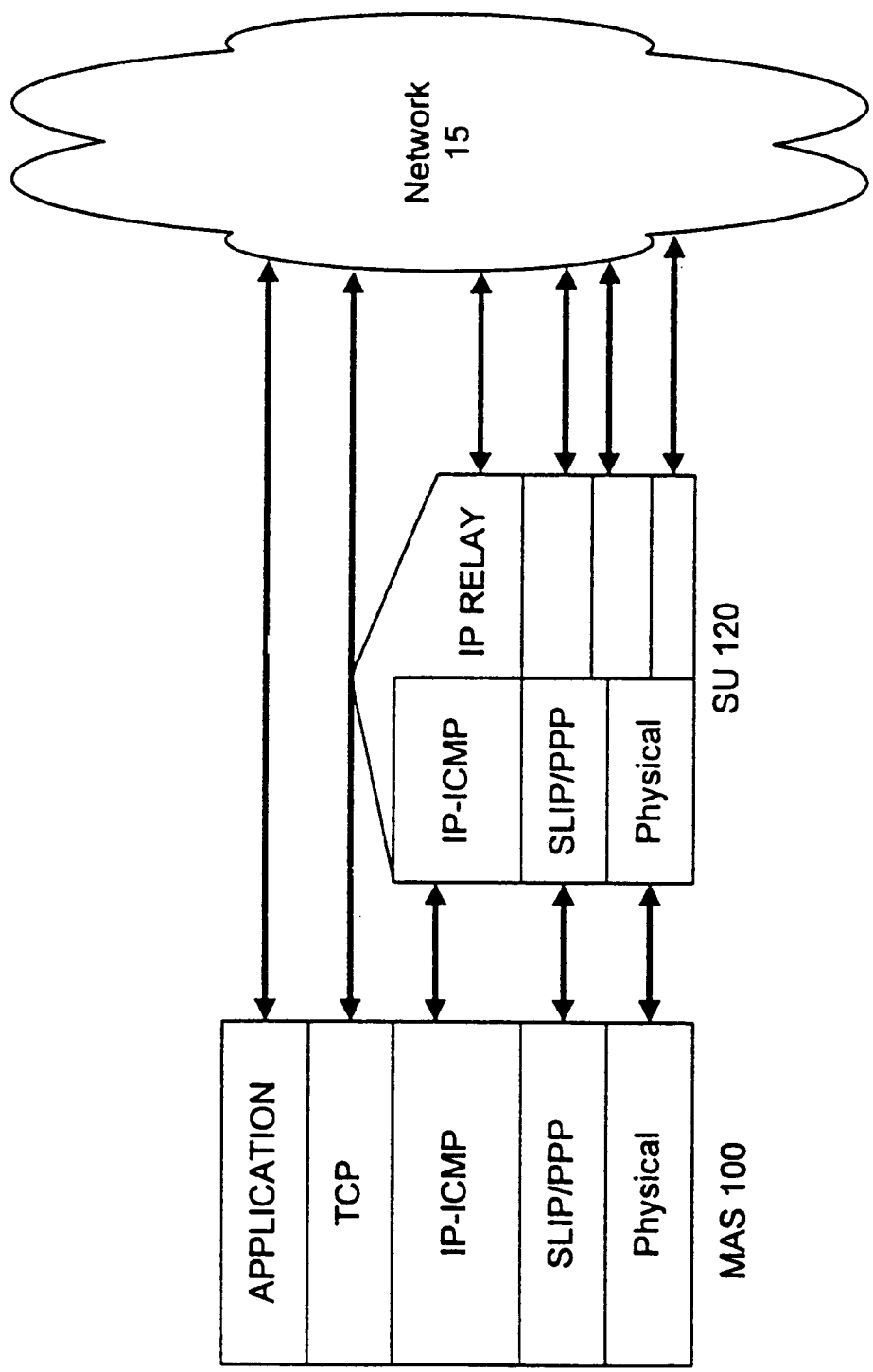
FIG. 8 is a diagram showing the signaling paths and signal relay between the subsystems of a wireless communication system according to a preferred embodiment of the present inventions.

Referring to FIG. 8, the SU-DTA 140 and the SU-MS 150 relay the packets between the network and the MAS 100. The SU 120 also is capable of handling the standard IP header compression used. This compression/decompression occurs at the SNDCP layer 240 level (FIG. 6). Alternatively, the compressed headers may only be detected at the SNDCP layer 240 and the SU 120 can transmit the compressed header to the MAS 100 this would then perform the decompression. ICMP messages are transmitted between the SU 120 and the MAS 100, and the SU 120 and the network 15. The ICMP messages are the error messages that are supported by the IP. The SU 120 is preferably able to transmit the ICMP messages from the network to the MAS 100. The following ICMP messages are preferably supported by the SU 120: (1) The packet received from the MAS 100 is larger than the maximum transmission size of the mobile unit 5; (2) The network to which connection is attempted does not support the required packet transmission protocol; (3) That the header transmitted by the MAS has been determined by the network to be non-compliant with the appropriate transmission standard, it is also preferred that the exact header byte that contains the error is denoted by a pointer; (4) That the SU 120 buffer has reached overflow; and (5) That the received packets are overlarge and cannot be fragmented for transmission to the MAS 100. The ICMP messages are addressed to the SU 120 by the network 15. However, the SU 120 does not act on the message but simply routes them to the MAS 10 for action.

Figure 9:
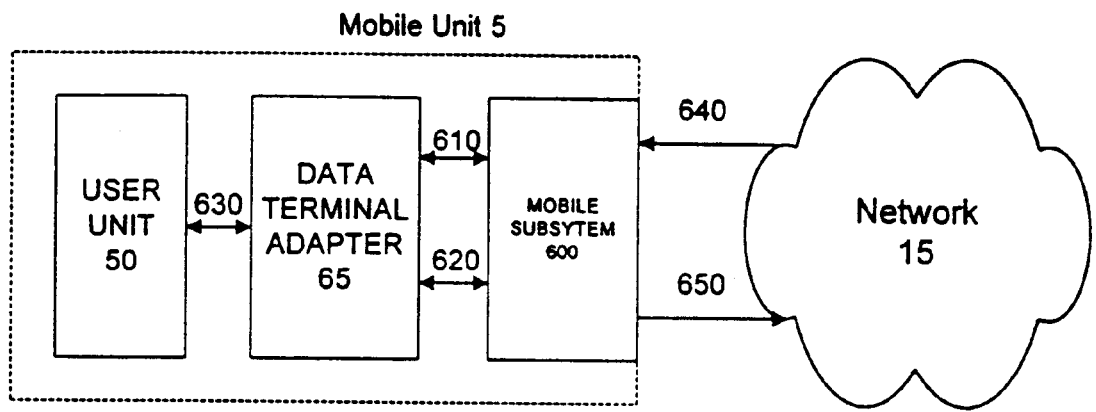
FIG. 9 is a first embodiment of a physical integration of the preferred components of a wireless communication system according to the present inventions.

Referring to FIG. 9, DTA 65 translates the data from a wireless type to a serial type when the CPRU is operating using a circuit switched transmission mode. DTA 65 can connect to User Terminal 50 through a number of different methods in this embodiment amongst them being a PC card which resides in the PC, a cable connection to the PC's RS-232 type serial port, or other any method which can be used to connect a PC to an external device. Mobile Station 600 transmits data and control information from the network 15 to the DTA 65. In this embodiment, a separate circuit switched data path 610 and packet switched data path 620 exist between DTA 65 and MS 600. Another data path 630 is used to communicate all information between the DTA 65 and the User Station 50.

The MS 600 transmits signals to network 15 using forward communication channel 650 and receives signals from the network using reverse communication channel 640.

Figure 10:
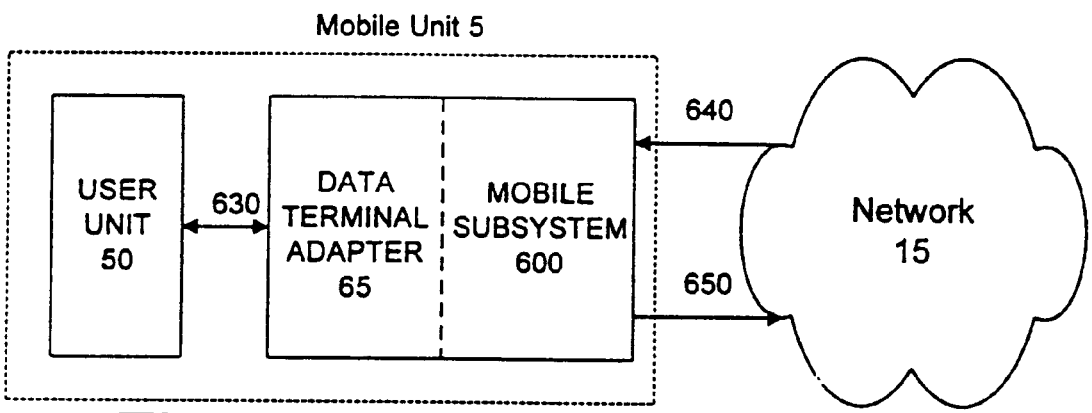
FIG. 10 is a second embodiment of a physical integration of the preferred components of a wireless communication system according to the present inventions.

Referring to FIG. 10, DTA 65 is an integrated portion of MS 600, see FIG. 2. In this arrangement signals are transmitted in the system similar to the transmissions described in FIG. 4, however the connection between DTA 65 and MS 600 is preferably a bus type connection.

Figure 11:
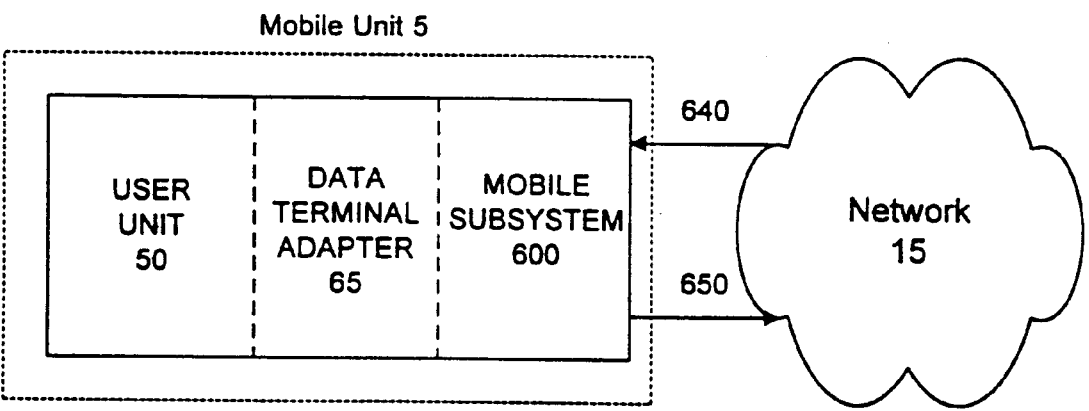
FIG. 11 is a third embodiment of a physical integration of the preferred components of a wireless communication system according to the present inventions.

Referring to FIG. 11, User Terminal 50, DTA 65 and MS 600 are contained in an integrated unit. The arrangement in FIG. 11 is designed to perform data services, voice services and application services similar to a Personal Digital Assistant (PDA).

In the embodiments depicted in FIGS. 9, 10 and 11 it is preferred that SU-MS 150 subsystem resides in MS 600, the SU-DTA 140 subsystem resides in DTA 65, the application software of the MAS 100 subsystem resides in User Terminal 5, and functions of SIM 170 subsystem reside in MS 600. Other divisions of the functional components are possible, and the above divisions are not to be construed as limiting in any way.

While the embodiments, applications and advantages of the present invention have been depicted and described, there are many more embodiments, applications and advantages possible without deviating from the spirit of the inventive concepts described herein. The invention should therefore should only be restricted in accordance with the spirit of the claims appended hereto and is not restricted by the preferred embodiments, specification or drawings.

What is claimed is:

1. A wireless communication device comprising:
   a data terminal adapter that communicates to an external device using a first protocol; and
   a mobile subsystem that communicates with said data terminal adapter and that communicates to an external device using a second protocol; and a decoder;
   wherein said mobile substystem receives a request signal comprising a request to establish communication with said external device and determines whether said external device communicates using said first protocol or said second protocol using said decoder.

2. A wireless communication device comprising:
   a data terminal adapter that communicates to an external device using a first protocol:
   a mobile subsystem that communicates with said data terminal adapter and that communicates to an external device using a second protocol;
   wherein said mobile subsystem receives a request signal comprising a request to establish communication with said external device and determines whether said external device communicates using said first protocol or said second protocol:
   said request signal comprising a telecommunications number and wherein said mobile subsystem comprises a number decoder that determines whether said external device communicates using said second protocol based upon said telecommunications number.

3. The wireless communication device of claim 2 wherein said number decoder comprises a network address and wherein said number decoder determines the network address associated with said external device by said telecommunications number.

4. The wireless communication device of claim 2 further comprising a processing device wherein said processing device communicates with wireless communication device across a single interface whether said wireless communication device communicates using said first protocol or said second protocol.

5. The wireless communication device of claim 4 wherein said processing device comprises a single client for communicating with said wireless communication device whether said wireless device communicates using said first protocol or said second protocol.

6. The wireless communication device of claim 2 wherein said mobile subsystem further comprises a subscriber identity module.

7. The wireless communication device of claim 2 further comprising a processing device that operates user applications.

8. The wireless communication device of claim 7 wherein said user applications comprise an e-mail application and world-wide web browser.

9. The wireless communication device of claim 2 wherein said external device comprises a network that communicates with said wireless communication device utilizing an internet protocol.

10. A wireless communication device comprising:
  a switch comprising a first input, a second input, a first output and a second output, said switch coupling said first input to said first output or to said second output in response to a signal received at said second input;
  a packet server comprising an input and an output, said input of said packet server coupled to said first output of said switch;
  a data terminal adapter comprising an input and an output, said input of said data terminal adapter coupled to said second output terminal of said switch;
  a transceiver coupled to said output of said data terminal adapter and to said output of said packet server; and
  a decoder comprising an input and an output said output of said decoder coupled to said second input of said switch, wherein when said decoder receives a signal indicative of a request for connection to a service capable of communicating using packet transmission protocols said decoder provides a signal at said output of said decoder instructing said switch to couple said first input of said switch to said first output of said switch.

11. The wireless communication device of claim 10 further comprising a port coupled to said first input of said switch.

12. The wireless communication device of claim 11 further comprising a computer having an output coupled to an input of said port.

13. The wireless communication device of claim 10 wherein said data terminal adapter communicates using an AT protocol.

14. The wireless communication device of claim 10, wherein said decoder comprises a database, said database containing a plurality of service numbers each corresponding to a service capable of communicating using a packet transmission protocol, wherein said signal indicative of a request for connection to a service capable of communicating using a packet transmission protocol comprises a telecommunications number and said decoder determines whether said telecommunications number corresponds to a telecommunications number for a service capable of communicating using a packet transmission protocol.

15. The wireless unit of claim 14 wherein said database further comprises a network address associated with each telecommunications number corresponding to a service capable of communicating using a packet transmission protocol.

16. A device capable of wireless communication using packet transmission protocols and circuit switched transmission protocols comprising:
  a first subsystem that operates user applications and issues a request to connect to a service external to said device;
  a second subsystem that receives said request to said service and determines using a decoder whether said service is capable of communicating using a packet transmission protocol, if said service is capable of communicating using said packet transmission protocol said second subsystem communicating with said service using said packet transmission protocol and if said service is not capable of communicating using a packet transmission protocol said second subsystem communicating with said service using a circuit switched transmission protocol; and
  a third subsystem that communicates with said second subsystem, said third subsystem communicating information indicative of access rights available to said device in communicating with said service.

17. The device of claim 16, wherein said first subsystem comprises a mobile application subsystem, said second subsystem comprises a subscriber unit and said third system comprises a subscriber identity module.

18. The device of claim 17 wherein said subscriber unit subsystem comprises a subscriber unit data terminal subsystem and a subscriber unit mobile subsystem, wherein said subscriber unit mobile subsystem communicates utilizing a packet transmission protocol and said subscriber unit data terminal subsystem communicates using a circuit switched protocol.

19. The device of claim 17 wherein said subscriber identity module comprises at least one telecommunications number and a network address associated with said at least one telecommunications number.

20. The device of claim 16 wherein said second subsystem comprises a number decoder and wherein said request comprising telecommunications number, said number decoder determining whether said telecommunications number corresponds to a service capable of communicating utilizing a packet transmission protocol.

21. The device of claim 16 wherein said first subsystem comprises a first internet address and said second subsystem comprises a second internet address, and wherein a message transmitted in a packet transmission protocol comprises said second internet address and wherein a message transmitted in a packet transmission protocol from said second subsystem to said first subsystem comprises said second internet address.

22. The device of claim 16 wherein said third subsystem comprises a function of said second subsystem.

\* \* \* \* \*

Disclaimer and Dedication 6,278,706—Benjamin Kendrick Gibbs; Izzet Murat Bilgic; Carl Mansfield, all of Colorado Springs, Colorado. WIRELESS PACKET DATA COMMUNICATION APPRATUS AND METHOD. Patent dated August 21, 2001. Disclaimer filed May 2, 2002 by the assignee, Opuswave Networks, Inc.

Hereby disclaims and dedicates to the Public all claims and entire term of said patent
*(Official Gazette, August 13, 2002)*